United States Patent [19]

Cronberg et al.

[11] 4,067,802
[45] Jan. 10, 1978

[54] ION EXCHANGE PROCESS FOR THE PURIFICATION OF BASE METAL ELECTROLYTE SOLUTIONS

[75] Inventors: Alvin D. Cronberg, Columbus; James A. Hartlage, Worthington; Joe W. Cotton, Marysville, all of Ohio

[73] Assignee: Ashland Oil, Inc., Ashland, Ky.

[21] Appl. No.: 684,645

[22] Filed: May 10, 1976

[51] Int. Cl.$^2$ ............................................. B01D 11/04
[52] U.S. Cl. .................................. 210/21; 75/101 BE; 204/108; 204/112; 204/119; 210/38 B; 423/139
[58] Field of Search ..................... 75/101 BE, 117; 204/108, 112, 119; 210/21, 24, 38 B; 423/139

[56] References Cited

U.S. PATENT DOCUMENTS

| | | | |
|---|---|---|---|
| 3,455,680 | 7/1969 | Ashbrook et al. | 75/101 BE |
| 3,479,378 | 11/1969 | Orlandini et al. | 75/101 BE |
| 3,637,711 | 1/1972 | Budde et al. | 75/101 BE |
| 3,872,209 | 3/1975 | Hazen et al. | 423/24 |
| 3,927,169 | 12/1975 | Goren et al. | 75/101 BE |
| 3,950,488 | 4/1976 | Skarbo et al. | 75/101 BE |
| 3,966,569 | 6/1976 | Reinhardt et al. | 423/139 |

Primary Examiner—Charles N. Hart
Assistant Examiner—Peter A. Hruskoci
Attorney, Agent, or Firm—William Kammerer

[57] ABSTRACT

A co-reagent system in the form of an admixture of a metal chelation collector and a mono- or dialkyl substituted phosphoric acid is adapted for selectively removing ferric iron from base metal electrolytic solutions in accordance with the liquid-liquid ion exchange extraction technique.

7 Claims, No Drawings

ION EXCHANGE PROCESS FOR THE PURIFICATION OF BASE METAL ELECTROLYTE SOLUTIONS

BACKGROUND OF THE INVENTION

1. Field of the Invention

This invention relates to an ion exchange method for removing contaminant metal ions from base metal electrolytic solutions.

2. Description of the Prior Art

In electrowinning and electrolytic refining operations, one is invariably confronted with the problem of build-up of contaminant metal ions in the applicable base metal electrolytic solution. For example, in the recovery of copper in either of said operations, the electrolyte will in time build up in ferric iron content. When this concentration reaches the level of about 4 grams per liter, the current efficiency is reduced to a point resulting in an unacceptably poor electroplating rate for the copper.

Hitherto, the removal of undesirable amounts of ferric iron from an electrolytic solution has been accomplished through base neutralization and metal precipitation techniques. This method of purification not only gives rise to an added cost for the base consumed, but more importantly involves difficult filtration steps so as to permit recovery of the resulting valuable metal hydroxides for recycling purposes. It is accordingly the object of this invention to provide a different expediency for removing such contaminants and specifically ferric iron from copper sulfate solutions, without encountering the disadvantages associated with the aforesaid prior art procedure.

SUMMARY OF THE INVENTION

In accordance with the present invention, ferric iron contaminants present in an electrolytic solution of copper, cobalt, nickel or zinc are selectively removed via the liquid-liquid ion exchange procedure wherein the exchange or extraction agent is a synergistic mixture of a mono- or dialkyl phosphoric acid and a conventional base metal ion chelation collector. In the preferred aspect of the invention, ferric iron is selectively removed from copper sulfate electrolytic solutions.

The foremost advantage of the purification procedure of this invention over the prior art, beyond the relative ease by which the method can be carried out, resides in the ability to make the procedure an efficient integrated closed circuit operation. Moreover, in this procedure no base is consumed as experienced in the indicated prior art method and hence a significant economic saving is accordingly provided.

DESCRIPTION OF THE PREFERRED EMBODIMENTS

The ion exchange method for recovering metal values from a dilute aqueous solution thereof as utilized in the implementation of the present invention is well known in the hydrometallurgical art. Basically, the method involves two distinct steps. In the first step an aqueous phase containing the extractable metal values in ionic form is intimately contacted with a water-immiscible organic solution of a metal ion chelation collector to facilitate an interfacial relationship of the phases whereby the metal ions are readily extracted into the organic phase as complexes of the collector. The second step, referred to as stripping, serves to regenerate the extracted metal complexes into the ionic form and to effect the transfer thereof to an aqueous phase to provide a relatively concentrated solution of the metal concerned.

Although extraction and stripping are distinct steps, they are generally conducted continuously in a closed circuit in commercial practice. Likewise, in accordance with this invention closed circuit process is preferred. However, the working examples given hereinbelow describe static extraction and stripping since this mode represents the best way of illustrating the invention. In light of this brief review of the conventional method of carrying out an ion exchange process applicable for the recovery of a variety of base metals, it will be evident to the artisan how this general procedure can be adapted for practicing the present selective extraction method.

Suitable metal ion chelation collectors useful in this invention include those compounds which contain either the 8-hydroxyquinoline structure or a hydroxy hydrocarbyl substituted oxime radical in the molecular configuration thereof. While the 8-hydroxyquinoline structure represents the actual functional moiety, the compound must nonetheless exhibit good oil solubility characteristics and at the same time possess an essentially nil solubility in aqueous media. This is achieved in the latter type compounds by substituting the oxine in the 7 position with a long chain aliphatic hydrocarbon group, preferably a mono unsaturated one and further containing methyl branching. A representative class of such compounds is described in U.S. Pat. No. 3,637,711. A commerical product of this type is currently marketed under the Trademark KELEX 100. Of the oxime types referred to, those compounds wherein the hydrocarbyl substitutent is aromatic are generally preferred, all as described in U.S. Pat. No. 3,428,449. A representative collector of this type is commercially available and is marketed under the Trademark LIX-64N.

Applicable organic phosphoric acids useful for combining with either of the aforementioned oxines or oximes include a variety of mono- and dialkyl phosphoric acids. As in the case of the chelation collectors, the alkyl substituent(s) should desirably be of sufficient length in order to provide oil soluble compounds. Of the plurality of organic phosphoric acids useful herein, the preferred co-reagent is di(2-ethylhexyl) phosphoric acid. Other suitable co-reagents include, however, such as di(1-methylheptyl) phosphoric acid, di(2-ethyl-4-methylpentyl) phosphoric acid, di(2-propyl-4-methylpentyl) phosphoric acid, and the like.

The water-immiscible organic solvents that can be employed for carrying out the instant extraction method include the various hydrocarbon solvents in which the chelation collector as well as the organic phosphoric acids are soluble. Other properties characterizing an acceptable solvent are chemical stability, low toxicity and high flash point. Such solvents can be the aliphatic, aromatic or alkyl aromatic hydrocarbons derived from petroleum sources. Representative solvents are such as toluene, xylene, kerosene, various high flash naphtha cuts and the like including mixtures thereof. A particularly preferred solvent is deodorized mineral spirits which is a mixture of high paraffinic hydrocarbon content. Other commercially marketed solvents specifically for extraction processes of the type herein concerned include such trademarked products as Escaid 100, Napoleum 470, and Isopar M.

The organic phase for use in the practice of this invention comprises, as indicated, the co-reagent system of the organic phosphoric acid and the metal ion chelation collector and a suitable solvent therefor. The organic phosphoric acid and the chelation collector can be broadly combined in a relationship of from about 1 to 4 moles of the organic phosphoric acid to one mole of the metal chelation collector. In the case of the oxine type collectors, the preferred relationship of the phosphoric acid to the collector is in the order of two moles to one mole, respectively. The amount of the coreagent system selected can be varied extensively. In this particular art, it is customary to refer to the amounts of the extractant component in terms of volumetric percent based on the organic phase. With this in mind, the co-reagent systems contemplated herein can range from about 5 to 40 volume percent of the organic phase and preferably from about 20 to 40 volume percent thereof. Amounts of the co-reagent system in excess of 40 volume percent can be utilized but such organic phases are prone to present problems during the stripping step.

Even in the use of organic phases containing a preferred amount of the co-reagent system, it is advisable to include within the organic phase what is referred to as a modifier, such serving to solvate the metal chelation collector thus rendering it less apt toward phase separation and to obviate certain phase separation difficulties that could arise in the stripping step. A variety of modifiers can be used for this purpose. Examples of suitable modifiers include tributyl phosphate, nonylphenol, dialkyl higher phosphates and the higher alkanols such as isodecanol and tridecyl alcohol. The preferred modifiers for use in the practice of this invention are the higher alcohols. An applicable amount of the modifier can be expressed in terms of the volumetric ratio it bears to the co-reagent system which broadly ranges from about 1:1 to 1:2 and preferably from 1:1.3 to 1:1.7, respectively.

The acidity of the electrolytic solutions amenable to the present purification procedure is important in realizing optimum loading of the extractable metals. Accordingly, in order to effectively remove the contaminant metals from base metal electrolytic solutions and specifically ferric iron from copper sulfate solutions, the acid content of the electrolyte is adjusted in the order of 100 to 200 grams of sulfuric acid per liter thereof. The optimum acidity of the electrolyte solution for the most part depends upon the particular type of chelation collector employed.

The aqueous stripping solutions adaptable for regenerating the ferric iron content of the organic phase are broadly those sulfuric acid solutions containing from about 400 to 600 grams per liter of the acid. Buildup of high concentrations of ferric iron in the stripping liquor is to be avoided since such will adversely affect stripping of the organic phase. The stripping liquor can be regenerated by reduction of its ferric iron content to the ferrous state. This reduction can be readily accomplished either by percolating the stripping liquor through activated charcoal in the presence of sulfur dioxide or by percolation through iron filings.

In order to illustrate to those skilled in the art the best mode contemplated for carrying out the present invention, the following working examples are set forth. As indicated, these examples are given primarily by way of illustration and accordingly any enumeration of details contained therein should not necessarily be construed as a limitation on the invention. The only limitations intended are those expressed in the appended claims.

EXAMPLE I

For the purpose of showing the effectiveness of this invention, a synthetic copper electrowinning solution was prepared containing 23 grams per liter (gpl) copper, 6.5 gpl $Fe^{+3}$ and 156 gpl $H_2SO_4$. An organic phase was also prepared, such being 1 liter of Escaid 100 (Exxon) in which was dissolved 0.4 mole of di(2-ethylhexyl) phosphoric acid (D2-EHPA) and 0.2 mole of the substituted oxine 7-[3-(5,5,7,7-tetramethyl-1-octenyl)]-8-hydroxyquinoline. Equal volumes of said aqueous and organic phases were mixed in a baffled beaker with a top shrouded turbine impeller operated at approximately 1000 RPM. The following Table I sets forth the extraction isotherm for this system for the various mixing times shown.

TABLE I

| Mixing Time (Min.) | gpl Cu Extracted | gpl $Fe^{+3}$ Extracted |
|---|---|---|
| 1 | Nil | 3.45 |
| 2 | 0.13 | 4.74 |
| 5 | 0.15 | 5.24 |
| 20 | 0.15 | 5.31 |

EXAMPLE II

The purpose of this example is to illustrate the stripping efficiency of the loaded organic phase of Example I versus sulfuric acid concentration after 2 minutes vigorous contact of equal volumes of the indicated loaded phase and acid stripping solution in a separatory funnel. The results obtained are outlined in the following Table II.

TABLE II

| Aqueous $H_2SO_4$ Conc. gpl | gpl $Fe^{+3}$ stripped | Stripping Efficiency- % |
|---|---|---|
| 150 | 0.61 | 11.5 |
| 250 | 0.80 | 15.1 |
| 350 | 2.18 | 41.1 |
| 500 | 4.76 | 89.6 |

EXAMPLE III

The purpose of this example is to illustrate the synergistic effect obtained when using the chelation ion collector of Example I in combination with the preferred dialkyl phosphoric acid. The identical synthetic electrolyte solution was employed in this example as was used in Example I. The organic solvent or carrier was Escaid 100. The amounts of the various extractants are given in terms of the molar amounts thereof present per liter of the carrier solvent. The mixing procedure was like that observed in Example I. The $Fe^{+3}$ extraction results obtained are set forth in the following Table III.

TABLE III

| Mixing Time (Min.) | 0.4M D2-EHPA | 0.2M oxine 0.2M TBP* | 0.2M oxine 0.4M D2 EHPA 0.2M TBP* |
|---|---|---|---|
| 1 | 0.14 | Nil | 2.95 |
| 2 | 0.43 | Nil | 3.66 |
| 5 | 0.93 | 0.15 | 4.31 |
| 20 | 2.43 | 0.36 | 4.52 |

*Tributyl phosphate

EXAMPLE IV

This example supplements the description of the present invention given in Examples I and II and essentially only differs therefrom in showing the effect of using different organic solvent carriers in combination with representative types of modifiers with the co-reagent system and amount thereof remaining the same. Further details with respect to the embodiments described herein together with the results obtained are set forth in Table IV below. The indicated gram molecular amounts of the various modifiers are for one liter of the organic carrier solvent.

molar ratio of from 1:1::1:4, respectively, and separating the organic phase from the aqueous phase to provide an aqueous phase containing a substantially reduced content of the ferric iron contaminants.

2. A process in accordance with claim 1 wherein said metal chelation collector is an 8-hydroxyquinoline substituted in the No. 7 position with a long chain aliphatic hydrocarbon group.

TABLE IV

| Carrier Solvent | ISOPAR M | | DEODORIZED MINERAL SPIRITS | | |
| --- | --- | --- | --- | --- | --- |
| Phase Modifier | 0.25 TBP[4] | 0.4M Iso-decanol | 0.2M TBP | 0.4M Iso-decanol | 0.4M Tridecyl Alcohol |
| $Fe^{+3}$ Loading[1] Capacity (gpl) | 6.59 | 5.81 | 6.94 | 6.31 | 5.68 |
| $Fe^{+3}$ Extraction Rate[2] | | | | | |
| 1 Min. | 2.04 | 1.48 | 1.97 | 1.66 | 2.90 |
| 2 Min. | 2.68 | 2.27 | 3.22 | 2.55 | 2.98 |
| 3 Min. | 3.54 | 2.66 | 3.22 | 3.46 | 3.46 |
| % Stripping Efficiency[3] | | | | | |
| 1 Min. | 66 | 88 | 62 | 85 | 81 |
| 5 Min. | 71 | 88 | 69 | 85 | 81 |
| Stripped Aqueous Appearance | Haze | Clear | Haze | Clear | Clear |

[1]Loading capacity after contact with 10 gpl $Fe^{+3}$ 150 gpl $H_2SO_4$
[2]After contact of 20 gpl Cu, 4 gpl $Fe^{+3}$ and 150 gpl $H_2SO_4$ with equal volume of organic phase.
[3]After contact of equal volumes of loaded organic phase from (1) with 500 gpl $H_2SO_4$
[4]Tributyl phosphate

What is claimed is:

1. A liquid-liquid ion exchange process for selectively removing ferric iron contaminants from an electrolyte solution of copper, cobalt, nickel or zinc sulfate which comprises first adjusting the acid content of said solution to provide from about 100 to 200 grams of $H_2SO_4$ per liter thereof and thereupon intimately contacting the acidified solution with a phase stabilized water-immiscible organic solvent solution of an extractant co-reagent consisting essentially of a mono- or dialkyl phosphoric acid and a metal chelation collector selected from the group consisting of an 8-hydroxyquinoline substituted in the No. 7 position with a long chain aliphatic hydrocarbon radical and an oil-soluble 2-hydroxy benzophenoneoxime wherein said metal chelation collector and said phosphoric acid are present in a molar ratio of from 1:1::1:4, respectively, and separating the organic phase from the aqueous phase to provide an aqueous phase containing a substantially reduced content of the ferric iron contaminants.

3. A process in accordance with claim 2 wherein said electrolyte solution is that of copper sulfate.

4. A process in accordance with claim 3 wherein said metal chelation collector is an 8-hydroxyquinoline substituted in the No. 7 position with a branched $C_8$–$C_{16}$ alkenyl group.

5. A process in accordance with claim 4 wherein said phosphoric acid is di-2-ethylhexylphosphoric acid.

6. A process in accordance with claim 5 wherein said metal chelation collector is 7-[3-(5,5,7,7-tetramethyl-1-octenyl)]-8-hydroxyquinoline.

7. A process in accordance with claim 6 wherein the molar ratio of said phosphoric acid to said metal chelation collector is about 1:2, respectively.

* * * * *